(12) United States Patent
Ishida et al.

(10) Patent No.: US 9,671,718 B2
(45) Date of Patent: Jun. 6, 2017

(54) IMAGE FORMING APPARATUS

(71) Applicants: Masahiro Ishida, Kanagawa (JP); Naoki Matsuda, Kanagawa (JP)

(72) Inventors: Masahiro Ishida, Kanagawa (JP); Naoki Matsuda, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/369,052

(22) Filed: Dec. 5, 2016

(65) Prior Publication Data

US 2017/0082942 A1    Mar. 23, 2017

Related U.S. Application Data

(63) Continuation of application No. 14/947,474, filed on Nov. 20, 2015, now Pat. No. 9,539,821.

(30) Foreign Application Priority Data

Nov. 27, 2014  (JP) .................................. 2014-239787

(51) Int. Cl.
*G03G 15/043* (2006.01)
(52) U.S. Cl.
CPC ................................. *G03G 15/043* (2013.01)
(58) Field of Classification Search
CPC ..... B41J 2/45; B41J 2/451; B41J 2/455; B41J 2/465; B41J 2/47; B41J 2/471; B41J 2002/453; G06K 15/12; H04N 1/113
See application file for complete search history.

(56) References Cited

U.S. PATENT DOCUMENTS

| | | | | |
|---|---|---|---|---|
| 5,877,884 | A | * | 3/1999 | Yanagisawa ......... G02B 26/121 359/198.1 |
| 6,134,041 | A | * | 10/2000 | Hong .................... G02B 26/121 347/261 |
| 2008/0198435 | A1 | | 8/2008 | Nakahata |
| 2009/0074462 | A1 | * | 3/2009 | Yamazaki ................ B41J 2/473 399/168 |
| 2010/0091083 | A1 | | 4/2010 | Itami et al. |

FOREIGN PATENT DOCUMENTS

| | | |
|---|---|---|
| JP | 2000-235396 A | 8/2000 |
| JP | 2001-012331 A | 1/2001 |
| JP | 2009-199051 A | 9/2009 |
| JP | 2010-117498 A | 5/2010 |

OTHER PUBLICATIONS

Mikami, Keiichi. Machine Translation of JP2010-117498A (2010).

* cited by examiner

*Primary Examiner* — Geoffrey Mruk
*Assistant Examiner* — Scott A Richmond
(74) *Attorney, Agent, or Firm* — Harness, Dickey & Pierce, P.L.C.

(57) ABSTRACT

An image forming apparatus includes a light source, an optical deflector, an optical deflector casing, a bearing, and a sound absorption unit. The optical deflector reflects and deflects an optical beam emitted from the light source, having a rotational reflection member disposed on a rotation shaft to perform optical scanning. The optical deflector casing seals a space in which the optical deflector. The bearing rotatably supports the rotation shaft of the rotational reflection member with respect to the optical deflector casing, and includes at least portion exposed to an external space outside the sealed space of the optical deflector casing. The sound absorption unit is disposed opposite the exposed portion of the bearing with the external space therebetween.

7 Claims, 9 Drawing Sheets

IMAGE FORMING APPARATUS

CROSS-REFERENCE TO RELATED APPLICATIONS

This patent application is a continuation of U.S. application Ser. No. 14/947,474, filed on Nov. 20, 2015, which is based on and claims priority pursuant to 35 U.S.C. §119 to Japanese Patent Application No. 2014-239787, filed on Nov. 27, 2014, in the Japan Patent Office, the entire disclosure of each of which is hereby incorporated by reference herein.

BACKGROUND OF THE INVENTION

Technical Field

Exemplary aspects of the present invention relate to an image forming apparatus.

Description of the Related Art

Conventionally, image forming apparatuses including an optical deflector and an optical deflector casing are known. The optical deflector deflects an optical beam emitted from a light source to perform optical scanning. The optical deflector casing provides a sealed space in which the optical deflector is disposed.

SUMMARY

In at least one embodiment of this disclosure, there is provided an improved image forming apparatus that includes a light source, an optical deflector, an optical deflector casing, a bearing, and a sound absorption unit. The optical deflector reflects and deflects an optical beam emitted from the light source, having a rotational reflection member disposed on a rotation shaft to perform optical scanning. The optical deflector casing seals a space in which the optical deflector. The bearing rotatably supports the rotation shaft of the rotational reflection member with respect to the optical deflector casing, and includes at least portion exposed to an external space outside the sealed space of the optical deflector casing. The sound absorption unit is disposed opposite the exposed portion of the bearing with the external space therebetween.

BRIEF DESCRIPTION OF THE DRAWINGS

The aforementioned and other aspects, features, and advantages of the present disclosure are better understood by reference to the following detailed description when considered in connection with the accompanying drawings, wherein.

Figure 1:
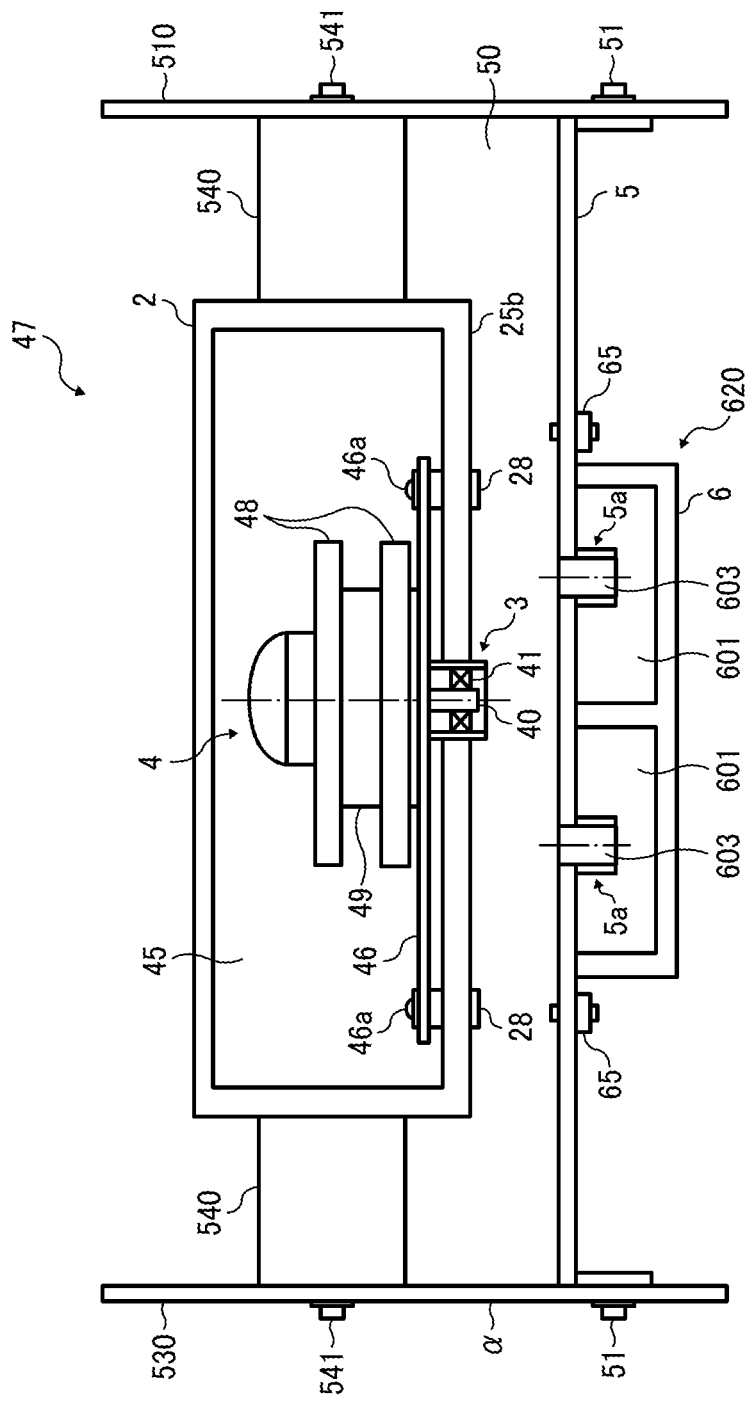
FIG. 1 is a schematic sectional view of a laser writing device and a bottom sound-absorption device arranged in a copier according to an exemplary embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF THE INVENTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have a similar function, operate in a similar manner, and achieve similar results.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Referring now to the drawings, exemplary embodiments of the present disclosure are described below. In the drawings for explaining the following exemplary embodiments, the same reference codes are allocated to elements (members or components) having the same function or shape and redundant descriptions thereof are omitted below.

Hereinafter, an electrophotographic copier (hereinafter called "a copier 500") serving as an image forming apparatus according to an exemplary embodiment of the present invention is described. In the present exemplary embodiment, a monochrome image forming apparatus is described as an example of the copier 500. However, the present exemplary embodiment can be applied to a known color image forming apparatus.

Figure 2:
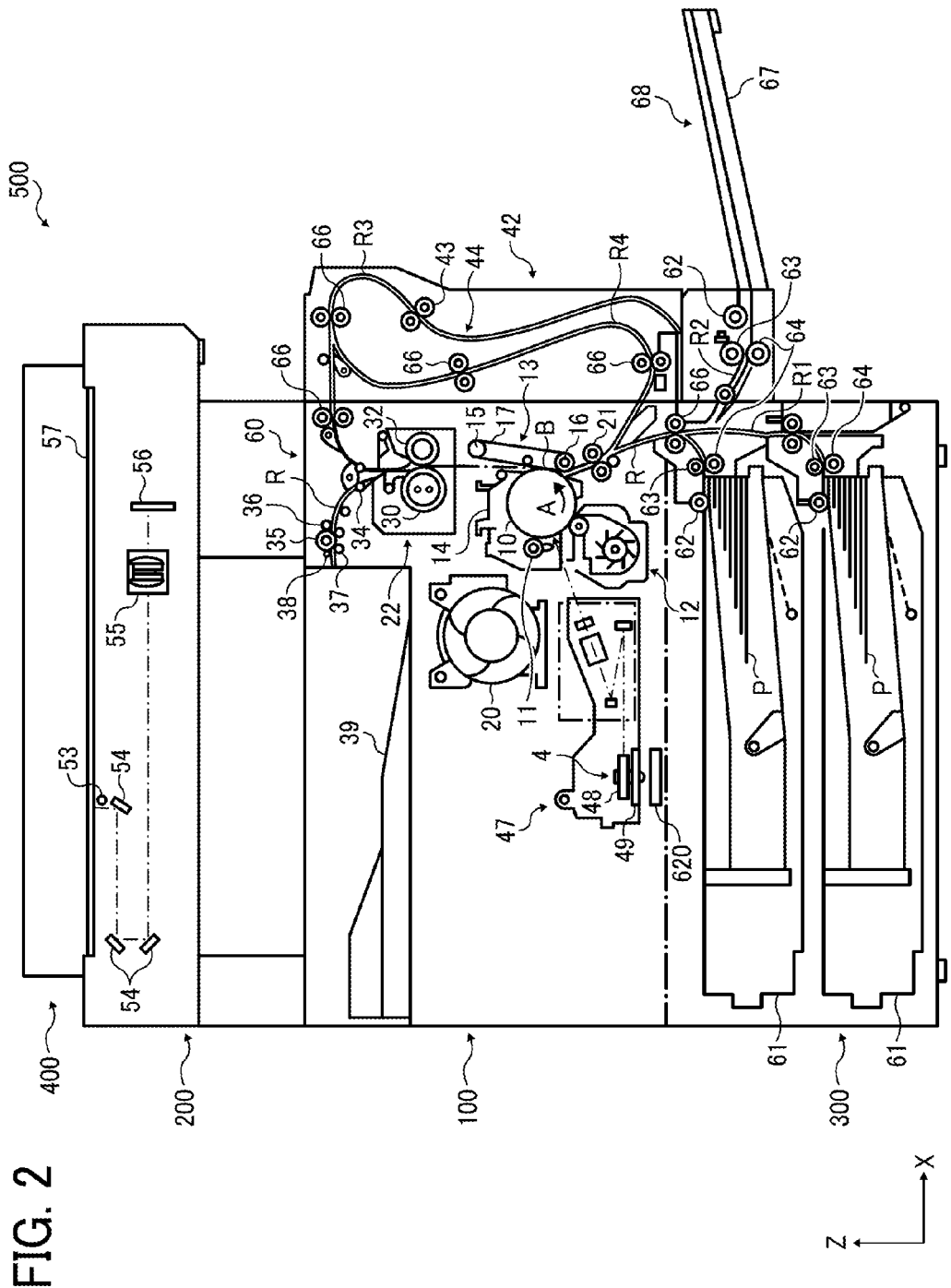
FIG. 2 is a schematic diagram of the copier according to the exemplary embodiment of the present invention.

First, a configuration of the copier 500 according to the exemplary embodiment of the present invention is described with reference to FIG. 2. In FIG. 2, the copier 500 includes an image forming unit 100, a scanner 200, a recording sheet bank 300, and an automatic document feeder 400. The scanner 200 serving as an image reading device is attached on the image forming unit 100, and the image forming unit 100 is placed on the recording sheet bank 300. The automatic document feeder 400 is attached on the scanner 200. The automatic document feeder 400 is rotatable around a back side (a rear side in FIG. 2) as a fulcrum. In FIG. 2, the copier 500 is illustrated in two dimensional space that is indicated by arrows X and Z.

Figure 3:
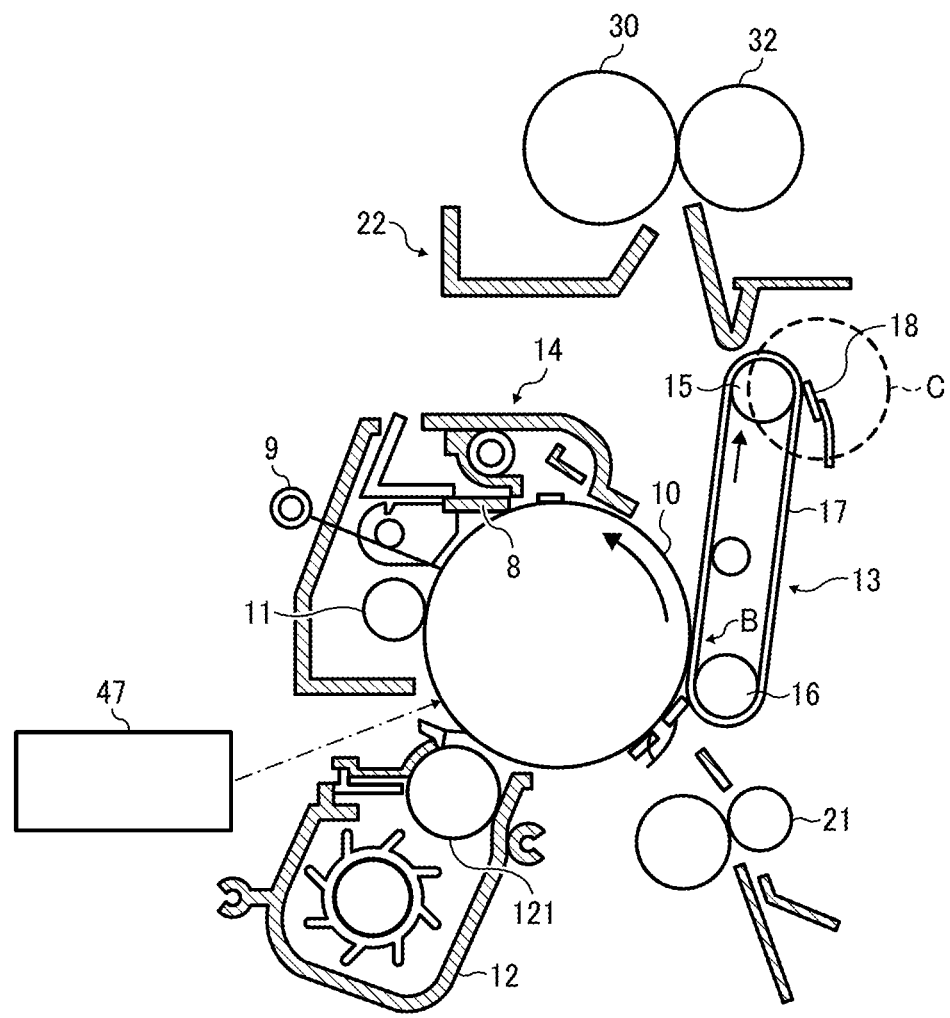
FIG. 3 is a schematic diagram of a photoconductor and the periphery thereof in the copier.

The image forming unit 100 includes a drum-shaped photoconductor 10, serving as a latent image bearer, that rotates in a direction indicated by an arrow "A" shown in FIG. 2. FIG. 3 is an enlarged schematic diagram illustrating the photoconductor 10 and the periphery thereof. As illustrated in FIG. 3, a discharge lamp 9, a charging device 11 with a charging roller, a developing device 12, a transfer unit 13, and a cleaning device 14 with a photoconductor cleaning blade 8 are arranged in the periphery of the photoconductor 10. The developing device 12 uses polymerization toner manufactured by a polymerization method as toner. The developing device 12 allows the polymerization toner to adhere to an electrostatic latent image on the photoconductor 10 using a developing roller 121 serving as a developer bearing member to develop the electrostatic latent image as a tone image.

The transfer unit 13 includes a transfer belt 17 that is looped around a first belt extension roller 15 and a second belt extension roller 16 serving as roller members. The transfer belt 17 is pressed against a circumferential surface of the photoconductor 10 in a transfer position B in which the toner image on the photoconductor 10 is transferred to a recording sheet P serving as a recording medium.

A belt cleaning blade 18 is disposed in a transfer belt cleaning area C, and contacts the first belt extension roller 15 via the transfer belt 17. The belt cleaning blade 18 removes foreign substances such as residual toner remaining on the transfer belt 17 and paper powder after the recording sheet P is separated from the transfer belt 17.

The image forming unit 100 includes a toner supply device 20 disposed on the left side of the charging device 11 and the cleaning device 14 illustrated in FIG. 1. The toner supply device 20 supplies a new toner to the developing device 12.

The image forming unit 100 includes a sheet conveyance device 60 for conveying a recording sheet P fed from a recording sheet cassette 61 of the recording sheet bank 300 to a discharged sheet stacking unit 39 through the transfer position B. The sheet conveyance device 60 conveys the recording sheet P along a supply path R1 or a manual supply path R2 and a sheet conveyance path R. A registration roller pair 21 is disposed on an upstream side of the transfer position B in a sheet conveyance direction on the sheet conveyance path R.

A heat fixing device 22 is disposed on a downstream side of the transfer position B in the sheet conveyance direction on the sheet conveyance path R. In the heat fixing device 22, a heat roller 30 serving as a heating member and a pressure roller 32 serving as a pressing member grasp the recording sheet P to fix a toner image with heat and pressure on the recording sheet P.

The image forming unit 100 also includes a discharge bifurcating claw 34, a discharge roller 35, a first pressure roller 36, a second pressure roller 37, and an elastic roller 38 on a downstream side of the heat fixing device 22 in the sheet conveyance direction. In addition, the image forming unit 100 includes the discharged sheet stacking unit 39 on which the recording sheet P with the toner image fixed by the heat fixing device 22 is stacked.

Moreover, the image forming unit 100 includes a switchback device 42 on the right side as illustrated in FIG. 2. The switchback device 42 conveys a recording sheet P along a reverse path R3 and a re-conveyance path R4. The reverse path R3 is bifurcated from a position of the discharge bifurcating claw 34 on the sheet conveyance path R. The conveyance path R4 guides the recording sheet P having passed the reverse path R3 to a position of the registration roller pair 21 of the sheet conveyance path R again. The reverse path R3 includes a switchback roller pair 43, whereas the re-conveyance path R4 includes a plurality of sheet conveyance rollers pairs 66.

As illustrated in FIG. 2, the image forming unit 100 includes a laser writing device 47 on the left side of the developing device 12. The laser writing device 47 includes an optical scanning system including a laser light source, an fθ lens, and a polygon scanner. The polygon scanner includes a polygon motor 49 and a rotational polygon mirror 48 serving as a rotational reflection member for scan operation.

The scanner 200 includes a light source 53, a plurality of mirrors 54, an optical imaging lens 55, and an image sensor 56 such as a charge-coupled device (CCD) image sensor. A contact glass 57 is disposed on the top of the scanner 200. The automatic document feeder 400 includes a document setting table and a document stacking table that is provided at a document discharge position. The automatic document feeder 400 includes a plurality of document conveyance rollers that convey a document from the document setting table to the document stacking table via a reading position on the contact glass 57 of the scanner 200.

The recording sheet bank 300 includes a plurality of recording sheet cassettes 61 arranged one on another. The recording sheet cassette 61 stores recording sheets P such as paper. For example, the paper is a recording material and an overhead projector (OHP) film. Each of the recording sheet cassettes 61 includes an access roller 62, a supply roller 63, and a separation roller 64. The supply path R1 connected to the sheet conveyance path R of the image forming unit 100 is formed on the right side of the recording sheet cassette 61 illustrated in FIG. 2. The supply path R1 also includes a plurality of sheet conveyance rollers pairs 66 for conveying the recording sheet P.

The image forming unit 100 includes a manual feed unit 68 disposed on the right side in FIG. 2. The manual feed unit 68 includes a manual feed tray 67 such that the manual feed tray 67 can be opened and closed. In the manual feed unit 68, the manual supply path R2 is formed to guide the recording sheet P set on the manual feed tray 67 to the sheet conveyance path R. The manual feed unit 68 includes an access roller 62, a supply roller 63, and a separation roller 64 as similar to the recording sheet cassette 61.

Next, operation of the copier 500 is described. When the copier 500 is used to make a copy of a document, a user turns on a main switch and sets the document on the document setting table of the automatic document feeder 400. In a case where the user makes a copy of a book document, the user opens the automatic document feeder 400 and sets the book document directly on the contact glass 57 of the scanner 200. The user closes the automatic document feeder 400 to press down the book document.

Subsequently, when the user presses a start button, the document set on the automatic document feeder 400 is moved to the contact glass 57 through a document conveyance path by a document conveyance roller. Then, the scanner 200 is driven to read content of the document, and the read document is discharged on the document stacking table. As for the document directly set on the contact glass 57, when the user presses the start button, the scanner 200 is immediately driven to read content of the document. When the content of the document is read, the scanner 200 irradiates a surface of the document on the contact glass 57 with light from the light source 53 while moving the light source 53 along the contact glass 57. Subsequently, the scanner 200 guides the reflected light from the surface of the document to the optical imaging lens 55 with the plurality of mirrors 54 to insert the light into the image sensor 56, so that the image sensor 56 reads the content of the document.

In the copier 500, the document is read. At the same time, the photoconductor 10 is rotated by a photoconductor driving motor. First, a surface of the photoconductor 10 is uniformly charged, for example, with approximately −1000 V by the charging device 11. Then, the charged surface of the photoconductor 10 is irradiated with a laser beam from the laser writing device 47 according to the content of the document read by the scanner 200, thereby forming an electrostatic latent image on the surface of the photoconductor 10. An area (a latent image area) irradiated with the laser beam has a surface potential of 0 V to −200 V, for example. Subsequently, the developing device 12 allows toner to adhere to the electrostatic latent image to develop it as a toner image.

In the copier 500, when the start button is pressed, the access roller 62 feeds recording sheets P from a recording sheet cassette 61 corresponding to selected paper size among the plurality of recording sheet cassettes 61 of the recording sheet bank 300. The recording sheets P fed by the access roller 62 are separated one by one by the supply roller 63 and the separation roller 64, and one recording sheet P is guided to the supply path R1. The recording sheet P is guided to the sheet conveyance path R by the sheet conveyance rollers pairs 66. When the recording sheet P conveyed to the sheet conveyance path R contacts the registration roller pair 21, the conveyance of the recording sheet P stops.

In a case where the manual feed unit 68 is used, the user opens the manual feed tray 67 and sets one or a plurality of recording sheets P on the manual feed tray 67. If the plurality of recording sheets P is set on the manual feed tray 67, only one recording sheet P is conveyed to the manual supply path R2 by the access roller 62, the supply roller 63, and the separation roller 64. The recording sheet P is then guided to the sheet conveyance path R by the sheet conveyance rollers pairs 66. When the recording sheet P guided to the sheet conveyance path R contacts the registration roller pair 21, the conveyance of the recording sheet P stops. Accordingly, the recording sheet P stopped by the registration roller pair 21 is fed to the transfer position B by the registration roller pair 21, which start to rotate in sync with the conveyance of a leading end of the toner image on the photoconductor 10 to the transfer position B.

The transfer unit 13 transfers the toner image on the photoconductor 10 to the recording sheet P fed to the transfer position B, so that a surface of the recording sheet P bears the toner image. After the toner image is transferred from the surface of the photoconductor 10, the cleaning device 14 removes a residual toner from the surface of the photoconductor 10. Moreover, the discharge lamp 9 removes a residual potential from the surface of the photoconductor 10. The removal of residual potential enables a surface potential to be averaged to a reference potential between 0V and −150 V, and the copier 500 becomes ready for next image formation, which is begun by the charging device 11.

Meanwhile, the recording sheet P bearing the toner image transferred in the transfer position B is conveyed to the heat fixing device 22 by the transfer belt 17. The heat fixing device 22 applies heat and pressure while the recording sheet P is conveyed between the heat roller 30 and the pressure roller 32, thereby fixing the toner image on the recording sheet P. Subsequently, the discharge roller 35, the first pressure roller 36, the second pressure roller 37, and the elastic roller 38 provide elasticity to the recording sheet P. Then, the recording sheet P is discharged and stacked on the discharged sheet stacking unit 39.

In duplex printing, in which images are formed on two sides of a recording sheet P, the discharge bifurcating claw 34 is switched. This enables the recording sheet P to be conveyed to the reverse path R3 from the sheet conveyance path R after a toner image is transferred and fixed on one side of the recording sheet P. The recording sheet P conveyed to the reverse path R3 is conveyed to a switchback position 44 by the sheet conveyance rollers pairs 66, and is switched back by the switchback roller pair 43. Subsequently, the recording sheet P is conveyed to the re-conveyance path R4, and again guided to the sheet conveyance path R by the sheet conveyance rollers pairs 66. The other side of the recording sheet P having passed the re-conveyance path R4 undergoes the similar process, so that a toner image is transferred.

Figure 4:
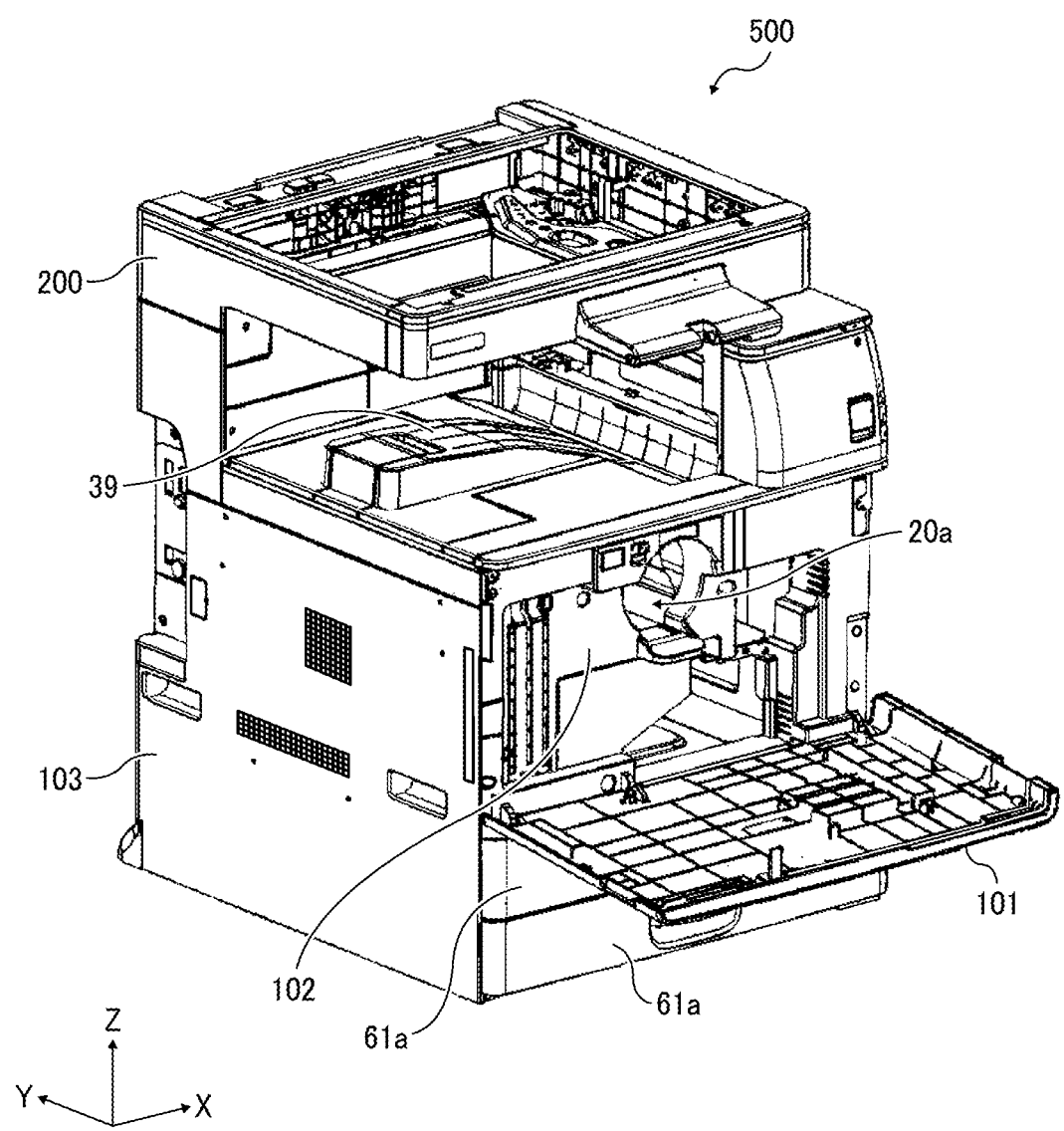
FIG. 4 is a perspective views of a state in which a front cover of the copier is opened.

FIG. 4 is a perspective view of a state in which a front cover 101 of the copier 500 is opened. In the copier 500 illustrated in FIG. 4, the automatic document feeder 400 and the optical system inside the scanner 200 are removed. Since the front cover 101 serving as an exterior cover is opened, a front inner cover 102 serving as an interior cover is exposed. In FIG. 4, moreover, a toner bottle in the toner supply device 20 is removed, and a bottle setting slot 20a in the front inner cover 102 is opened. The bottle setting slot 20a serves as an area into which the toner bottle is inserted. Moreover, the copier 500 includes a sheet cassette exterior cover 61a including a handle for pulling out the recording sheet cassette 61. The sheet cassette exterior cover 61a is disposed below the front cover 101. In FIG. 4, the copier 500 is illustrated in three-dimensional space that is indicated by arrows X, Y and Z. Similarly, in FIGS. 5 and 6, the copier 500 is illustrated in three-dimensional space indicated by arrows X, Y and Z.

Figure 5:
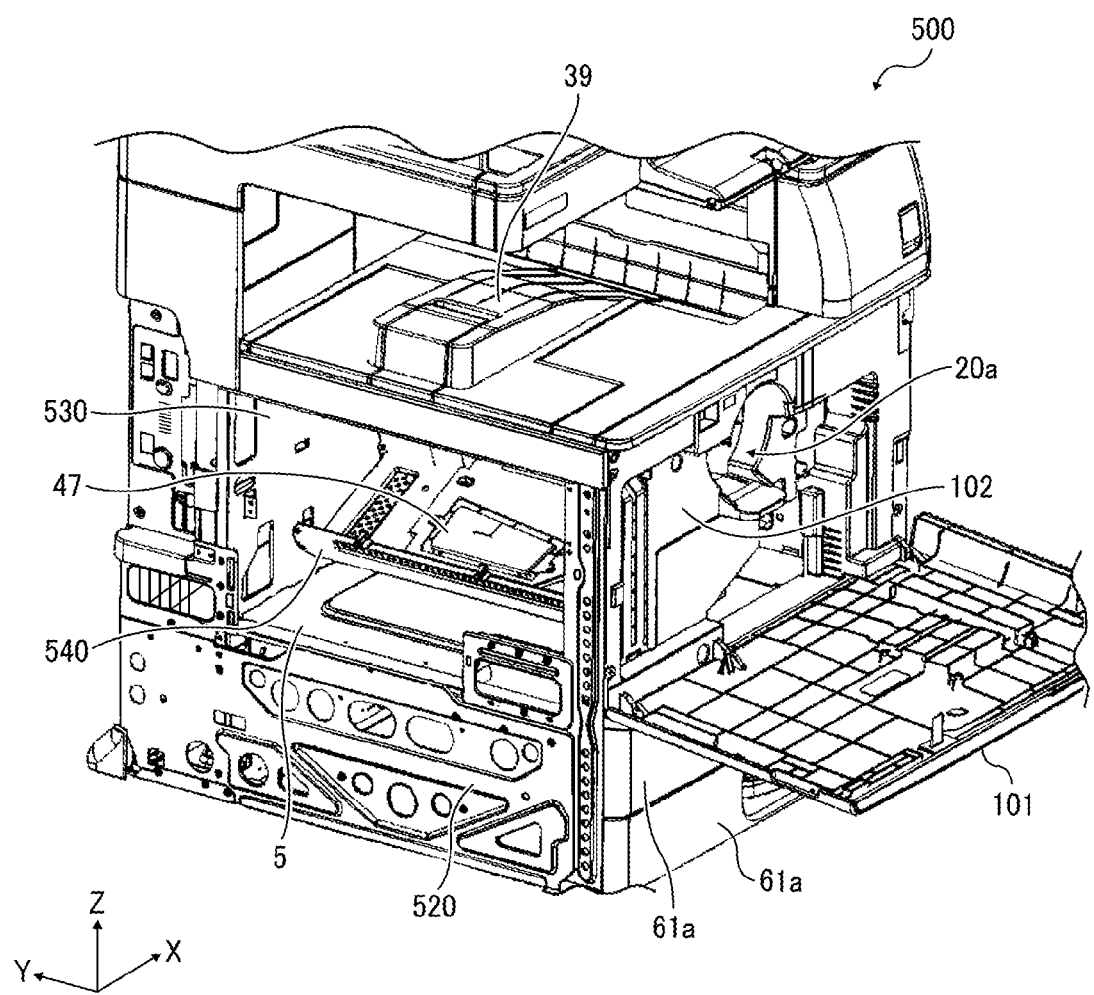
FIG. 5 is a perspective view of the copier when a left exterior cover is removed from the state illustrated in FIG. 4.
Figure 6:
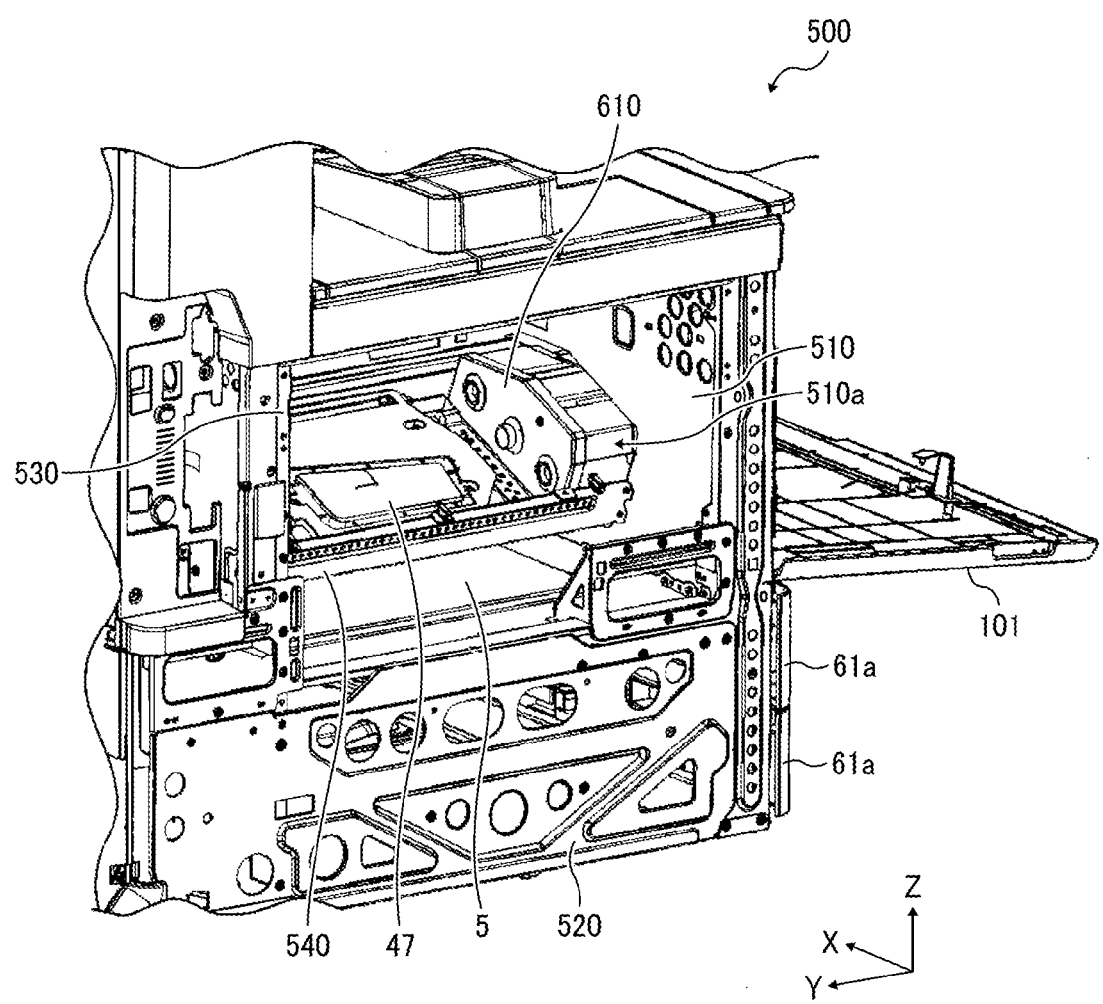
FIG. 6 is a perspective view of an inner surface of a front casing plate to which a front inner cover is fixed for the copier in the state illustrated in FIG. 5.

FIG. 5 is a perspective view of the copier 500 with a left casing plate 520 exposed when a left exterior cover 103 is removed from the state illustrated in FIG. 4. FIG. 6 is a perspective view of an inner surface of a front casing plate 510 of the copier 500 in the state illustrated in FIG. 5. The front casing plate 510 is disposed inside the front inner cover 102, and the front inner cover 102 is fixed to the front casing plate 510.

As illustrated in FIG. 6, the copier 500 includes a front sound-absorption device 610 employing a Helmholtz resonator. The front sound-absorption device 610 is disposed opposite the laser writing device 47 inside the front side of the copier 500.

Figure 7:
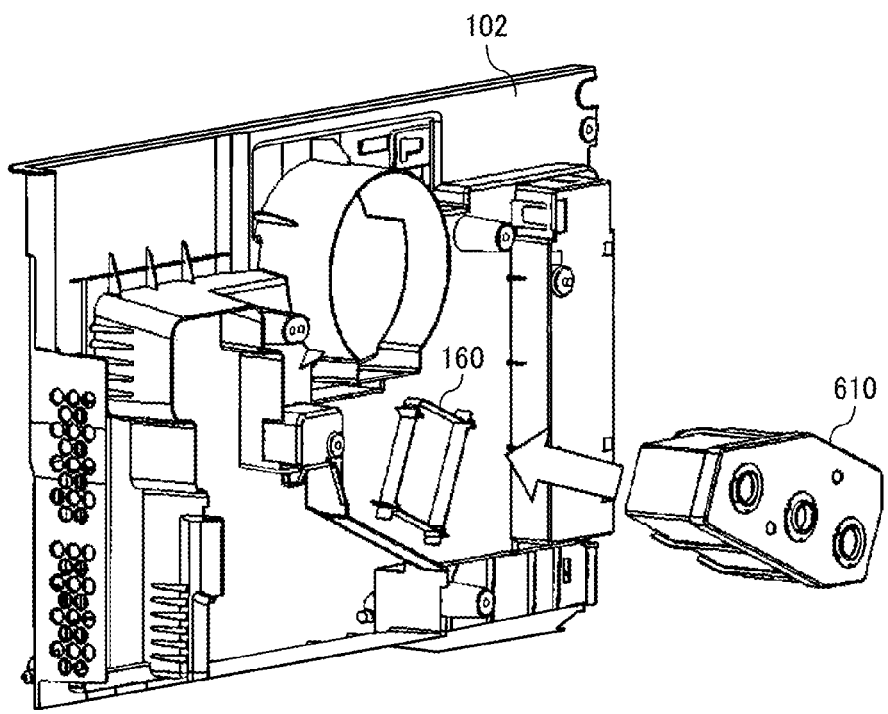
FIG. 7 is a diagram of an attachment position of a sound absorption device in the front inner cover.

FIG. 7 is a diagram of an attachment position of the front sound-absorption device 610 in the front inner cover 102. As illustrated in FIG. 7, the front inner cover 102 includes a front sound-absorption device mount 160 on an inner surface thereof. The front sound-absorption device 610 is attached and fixed to the front sound-absorption device mount 160 as indicated by an arrow illustrated in FIG. 7, and the front inner cover 102 is fixed to the front casing plate 510. Accordingly, as illustrated in FIG. 6, the front sound-absorption device 610 projects inward from a sound absorption device opening 510a formed on the front casing plate 510.

Moreover, as illustrated in FIG. 2, the copier 500 includes a bottom sound-absorption device 620, serving as a sound absorption unit, below the laser writing device 47.

Each of the front sound-absorption device 610 and the bottom sound-absorption device 620 of the copier 500 according to the present exemplary embodiment serves as a sound absorption device with a Helmholtz resonator.

Figure 8:
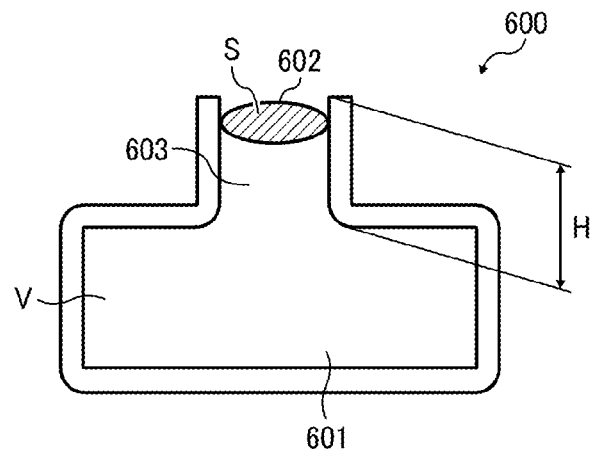
FIG. 8 is a schematic diagram of a sound absorption device with a Helmholtz resonator.

FIG. 8 is a schematic view of a sound absorption device 600 with a Helmholtz resonator. The sound absorption device 600 is illustrated as an example of either the front sound-absorption device 610 or the bottom sound-absorption device 620. As illustrated in FIG. 8, the sound absorption device 600 has a container-like shape with a narrow inlet, and includes a cavity portion 601 cavity and a communication portion 603. The cavity portion 601 has a certain volume, and the communication portion 603 is smaller than the cavity portion 601. The sound absorption device 600 absorbs sound having a specific frequency, the sound coming to the communication portion 603. A frequency of sound that is absorbed by the sound absorption device 600 can be expressed as follows.

$$f = \frac{c}{2\pi}\sqrt{\frac{S}{V(H + \Delta r)}} \quad \text{Equation 1}$$

where "V" is a volume of the cavity portion 601, "S" is an area of an opening 602 in the communication portion 603, "H" is a length of the communication portion 603, "c" is a sound speed, and "f" is a sound absorption frequency in the sound absorption device 600.

In Equation 1, "$\Delta r$" represents an opening edge correction. Generally, "$\Delta r$=0.6 r" is used where "r" is a radius when a cross section of the communication portion 603 is circle. As expressed by Equation 1, a frequency of sound absorbed by the sound absorption device 600 can be determined using the volume V of the cavity portion 601, the length H of the communication portion 603, and the opening area S of the communication portion 603.

The copier 500 generates various sounds such as a driving sound of a driving motor for transmitting rotation drive to various rollers, a moving sound of moving members such as various rollers, and a rotation sound of the polygon mirror 48 of the laser writing device 47. Such sounds may be transmitted outside the copier 500 and is perceivable as noise. The sound absorption device 600 is formed to deal with a frequency of a sound that needs to be prevented from being transmitted outside.

Figure 9:
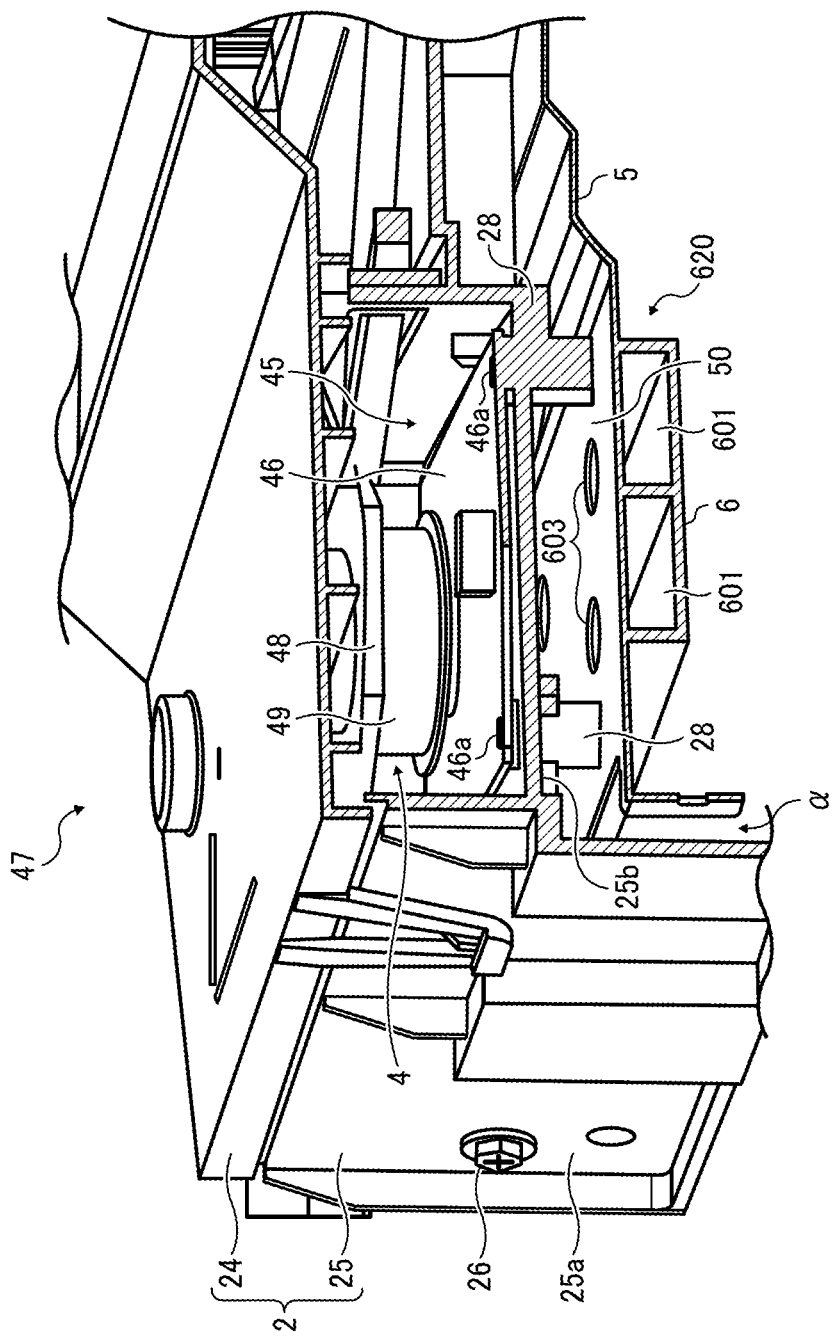
FIG. 9 is a perspective sectional view partially illustrating the laser writing device and the bottom sound-absorption device according to the exemplary embodiment.

FIG. 1 is a sectional view schematically illustrating the laser writing device 47 and the bottom sound-absorption device 620 of the copier 500 according to the present exemplary embodiment. FIG. 9 is a perspective sectional view partially illustrating the laser writing device 47 and the bottom sound-absorption device 620 of the copier 500. FIG. 1 is the schematic sectional view of the laser writing device 47 and the bottom sound-absorption device 620 as seen from the left side of FIG. 9.

The laser writing device 47 includes a polygon scanner 4 serving as an optical deflector. The polygon scanner 4 allows the polygon mirror 48 serving as a rotational reflection member to reflect and deflect an optical beam emitted from a light source, thereby performing optical scanning. Moreover, the laser writing device 47 includes a casing 2 serving as an optical deflector casing, and a bearing 3. The casing 2 provides a polygon arrangement space 45, serving as a sealed space, in which the polygon scanner 4 is disposed. The bearing 3 rotatably supports the polygon scanner 4 with respect to the casing 2. As illustrated in FIG. 9, the casing 2 includes a casing cover 24 placed on a casing body 25 to form the polygon arrangement space 45. In the present exemplary embodiment, the polygon arrangement space 45 is a sealed space in a strict sense, that is, movements of gas from and to an external unit are completely blocked. However, the polygon arrangement space 45 is not limited thereto as long as movements of gas between inside and outside the polygon arrangement space 45 are blocked such that a foreign substance such as paper powder and dust outside does not get into the polygon arrangement space 45.

The polygon scanner 4 includes a polygon board 46 to which the polygon motor 49 is fixed. The polygon board 46 is fixed to a polygon fixation unit 28 with a polygon fixation screw 46a, so that polygon scanner 4 is fixed to the casing 2. The polygon fixation unit 28 is disposed on a bottom wall 25b of the casing body 25. In the polygon scanner 4, the polygon mirror 48 is fixed to a shaft 40 that is a rotor of the polygon motor 49. When the polygon motor 49 operates, the shaft 40 serving as a rotation shaft and the polygon mirror 48 are rotated.

As illustrated in FIG. 1, the bearing 3 rotatably supports the shaft 40 via a bearing member 41. In the present exemplary embodiment, an air bearing is used as the bearing member 41. However, the bearing is not limited thereto, and a bearing different from the air bearing may be used as the bearing member 41. Moreover, in the casing 2 as illustrated in FIG. 1, a hole is provided on the bottom wall 25b serving as a bearing support wall for supporting the bearing 3, and the bearing 3 is fitted into the hole. Thus, one portion of the bearing 3 is exposed to an air cooling space 50, serving as an external space, from the casing 2. The air cooling space 50 is provided outside the polygon arrangement space 45, and serves as space where gas can be moved in and out. This enables the bearing 3 to be cooled by contact with outside air. In the present exemplary embodiment, the bearing 3 is a component attached to the polygon motor 49, and outer circumference of the bearing 3 is attached to the hole provided on the bottom wall 25b of the casing 2.

When the polygon motor 49 operates, heat is generated in the bearing 3 by rolling resistance that is generated by rotation of the shaft 40 at high speed. Thus, each member of the bearing 3 is heated. The air cooling space 50 allows the outside air to pass therethrough, and one portion of the bearing 3 is exposed to the air cooling space 50. Accordingly, the bearing 3 is cooled by contacting the outside air, and a temperature rise due to rotation of the shaft 40 is suppressed. Such cooling of the bearing 3 can in turn suppress the temperature rise near the polygon scanner 4.

If the bearing 3 of the polygon scanner 4 and the polygon mirror 48 were to be disposed inside a sealed space, heat generated in the bearing 3 would not escape. In such a case, a temperature of the air inside the sealed space rises. Such an air temperature rise inside the sealed space can cause deformation of parts of the optical system, such as a polygon scanner. The deformation of the member may change a beam path, and a desired image may not be obtained. In the copier 500 according to the present exemplary embodiment, on the other hand, the bearing 3 is exposed to the air cooling space 50 outside the polygon arrangement space 45 serving as the sealed space in which the polygon mirror 48 is disposed. Such arrangement can suppress a temperature rise of the sealed space due to the heat generated in the bearing 3.

If the communication portion 603 of the Helmholtz resonator were to be disposed toward the sealed space in which temperature tends to rise more easily with heat generated in the bearing 3, the following problem might occur. That is, if temperature of the air in the sealed space in which the communication portion 603 is disposed were to rise, sound speed would accelerate. In such a case, an increase in value of the sound speed "c" in Equation 1 changes a value of the sound absorption frequency "f" which is absorbed by the Helmholtz resonator. Such a change in the sound absorption frequency "f" causes the absorption frequency to shift with respect to a frequency of the sound generated when the polygon scanner 4 is driven. Consequently, a desired sound absorption effect cannot be obtained, or the sound generated when the polygon scanner 4 is driven cannot be suppressed.

In the copier 500 according to the present exemplary embodiment, on the other hand, the communication portion 603 of the Helmholtz resonator is disposed in the air cooling space 50 in which the outside air passes and temperature does not tend to rise with heat generated in the bearing 3. This suppresses a shift in the sound absorption frequency of the Helmholtz resonator caused by the temperature rise of space in which sound is absorbed, thereby maintaining a desired sound absorption effect.

As illustrated in FIG. 1, the bottom sound-absorption device 620 for absorbing sound generated by rotation of the polygon mirror 48 is disposed opposite the exposed bearing 3 with the air cooling space 50 therebetween. This can suppress noise generated when the polygon scanner 4 is rotated. In the polygon scanner 4, wind noise is generated by rotation of the polygon mirror 48. Moreover, in the bearing 3, the air bearing vibrates when the polygon mirror 48 rotates. The vibration of the air bearing causes pressure loss. A change in the pressure due to the pressure loss generates sound. Although the bearing 3 not covered with the casing 2 is a source of the sound, the bottom sound-absorption device 620 disposed directly below the bearing 3 can absorb the sound from the bearing 3 to suppress noise.

The casing 2 of the laser writing device 47 is fixed to a supporting metal plate 540 with a casing screw 26. The supporting metal plate 540 is fixed to the front casing plate 510 and a back casing plate 530 with supporting plate fixation screws 541. The supporting metal plate 540 includes a wall portion that extends in a vertical direction. The laser writing device 47 is attached to the supporting metal plate 540 such that the wall portion is inserted into a position "a" shown in FIG. 9. The casing body 25 of the casing 2 includes a casing leg 25a that extends to a lower portion relative to the bottom wall 25b. The casing leg 25a is fixed to the wall portion of the supporting metal plate 540 with a casing screw 26 to fix the casing 2 to the supporting metal plate 540. Moreover, the supporting metal plate 540 includes an opening where the polygon scanner 4 is positioned. As illustrated in FIG. 1, the bottom wall 25b of the casing 2 projects below the supporting metal plate 540.

A bottom casing plate 5 for the image forming unit is disposed below the supporting metal plate 540. The bottom casing plate 5 is made of metal, and fixed to the front casing plate 510 and the back casing plate 530 with bottom casing plate fixation screws 51. In the copier 500 according to the present exemplary embodiment, a burring process unit 5a is disposed in a position perpendicularly below the bottom casing plate 5 serving as a structure member disposed below the polygon scanner 4, so that the communication portion 603 is formed. The communication portion 603 serves as a short pipe of the Helmholtz resonator. Moreover, a sound absorption cover 6 closely contacts an undersurface of the bottom casing plate 5 with the burring process unit 5a disposed. Accordingly, the bottom sound-absorption device 620 with the Helmholtz resonator is formed. The sound absorption cover 6 is fixed to the bottom casing plate 5 with cover fixation screws 65.

The rotation of the polygon mirror 48 causes vibration in the bearing 3, and such vibration generates sound. The Helmholtz resonator with a sound absorption frequency that is set to absorb such sound may receive solid-borne vibration having substantially the same frequency as the sound absorption frequency. In such a case, the sound having such a frequency comes from the Helmholtz resonator. According to the copier 500 in the present exemplary embodiment, the supporting metal plate 540 and the bottom casing plate 5 are different members. The supporting metal plate 540 supports the casing 2 into which the bearing 3 is fitted, and the bottom casing plate 5 forms the bottom sound-absorption device 620 including the Helmholtz resonator. A path for enabling the vibration to be transmitted in a solid-borne manner from the bearing 3 to the bottom casing plate 5 is provided by a plurality of different members fixed by a fixation member. Herein, the configuration in which the different members are fixed by the fixation member represents a configuration in which the different members are separated when the fixation member such as a screw is released, instead of integration of the different members by welding.

In a case where one of the different members vibrates in a fixation portion in the configuration in which the different members are fixed by the fixation member, relative displacement occurs with respect to the other member. In such a case, not all vibration energy is transmitted to the other member, and the vibration energy is reduced. The fixation portion in which the different members are fixed by the fixation member is arranged in the path for enabling the vibration to be transmitted in a solid-borne manner from the bearing 3 to the bottom casing plate 5. Such arrangement of the fixation portion in the path attenuates the vibration generated in the bearing 3, thereby suppressing transmission of the vibration to the bottom casing plate 5. Accordingly, this can suppress noise to be generated from the Helmholtz resonator of the bottom sound-absorption device 620 due to solid-borne vibration having substantially the same frequency as a sound absorption frequency.

In the copier 500, the vibration generated in the bearing 3 is transmitted to the casing 2 and then to the supporting metal plate 540 via the fixation portion provided with the casing screw 26. Subsequently, the vibration is transmitted to the front casing plate 510 and the back casing plate 530 via the fixation portions provided with the respective supporting plate fixation screws 541. The vibration transmitted to the front casing plate 510 and the back casing plate 530 is transmitted to the bottom casing plate 5 via the fixation portions provided by the respective bottom casing plate fixation screws 51. Accordingly, there is a plurality of fixation portions in the transmission path through which the vibration is transmitted in the solid-borne manner from the bearing 3 to the bottom casing plate 5. This attenuates vibration energy each time the vibration is transmitted through the fixation portion. Therefore, such arrangement can suppress transmission of the vibration generated in the bearing 3 to the bottom casing plate 5 serving as a member for forming the Helmholtz resonator.

When the vibration is transmitted, the sound absorption cover 6 generates sound louder than that generated by the bottom casing plate 5 forming the Helmholtz resonator of the bottom sound-absorption device 620. In the copier 500, since the vibration transmitted to the bottom casing plate 5 is transmitted to the sound absorption cover 6 via the fixation portion provided with the cover fixation screw 65, the vibration at the sound absorption cover 6 is more attenuated than that at the bottom casing plate 5. This can suppress generation of sound due to transmission of the vibration to the sound absorption cover 6.

As illustrated in FIGS. 1 and 9, a lower end of the polygon fixation unit 28 disposed on the bottom wall 25b extends toward the bottom casing plate 5 according to a length of the polygon fixation screw 46a. However, the lower end of the polygon fixation unit 28 does not contact the bottom casing plate 5. In a case where the polygon fixation unit 28 contacts the bottom casing plate 5, there is a possibility that vibration of the casing 2 may be transmitted in the solid-borne manner to the bottom casing plate 5 via the contact portion. The non-contact arrangement can prevent transmission of barely attenuated vibration to the bottom casing plate 5.

Moreover, in the path for enabling vibration to be transmitted in the solid-borne manner from the bearing 3 to the bottom casing plate 5, the vibration is transmitted via the front casing plate 510 or the back casing plate 530. Each of the front casing plate 510 and the back casing plate 530 is a casing member serving as a frame of the copier 500, and is larger than other metal members of the copier 500. When vibration is transmitted from a member of a vibration source to a certain member via a fixation portion, the vibration is spread over the certain member. Then, the vibration is further transmitted to a next member via another fixation portion different that of the vibration source. Herein, as the certain member becomes larger, the amount of vibration energy consumed for vibration of the entire certain member increases, and the vibration to be transmitted to the next member can be attenuated. According to the copier 500, in the path enabling the vibration to be transmitted in the solid-borne manner, the vibration can be transmitted via the front casing plate 510 or the back casing plate 530. Thus, the vibration transmitted to the bottom casing plate 5 can be more attenuated than that transmitted via only other small members.

In the copier 500, the communication portion 603 serving as a short pipe of the Helmholtz resonator is formed in the bottom casing plate 5 including a metal plate that provides a good sound insulation effect. Since the bottom casing plate 5 serves as a structure member forming a frame of the copier 500, the short pipe of the Helmholtz resonator can be formed without an additional component. Moreover, the sound absorption cover 6 forming the cavity portion 601 is made of resin, so that the cavity portion 601 can be readily provided.

As illustrated in FIG. 1, the bottom sound-absorption device 620 includes the short pipe inserted into the cavity portion 601, the short pipe being formed by burring process. Thus, an edge of the burring processed metal plate is hidden to enhance safety. This can prevent an operator from being disturbed by the burring processed portion when the operator performs a mounting operation and a maintenance operation.

The bottom sound-absorption device 620 employs two members of the bottom casing plate 5 and the sound absorption cover 6 to form the Helmholtz resonator. The sound absorption cover 6 is prepared in a shape such that one side of space to be the cavity portion 601 is opened. This open side is blocked by the bottom casing plate 5 to form the cavity portion 601. Thus, the cavity portion 601 with a predetermined volume can be readily formed compared to formation of the cavity portion 601 with one member.

Moreover, since the bottom casing plate 5 is made of metal having a higher density than resin of which the sound absorption cover 6 made, transmission of sound can be suppressed compared to a configuration in which the bottom casing plate 5 is made of only resin. Moreover, since the sound absorption cover 6 is made of resin with processing that is easier than that of the bottom casing plate 5, a volume of the cavity portion 601 can be obtained with high accuracy while a sealed property remains compared to a configuration in which the sound absorption cover 6 is made of only metal substantially the same as that of the bottom casing plate 5. Accordingly, the volume of the cavity portion 601 is obtained, so that sound of a low frequency can be absorbed.

Moreover, the cavity portion 601 is formed with high accuracy while a sealed property remains. This enhances a sound absorption effect.

In the bottom sound-absorption device 620, the bottom casing plate 5 and the sound absorption cover 6 are fastened with the cover fixation screws 65 as described above. Since the bottom casing plate 5 and the sound absorption cover 6 are firmly tightened to enhance the degree of sealing, a sound absorption effect can be enhanced in the bottom sound-absorption device 620 as the Helmholtz resonator.

Figure 10:
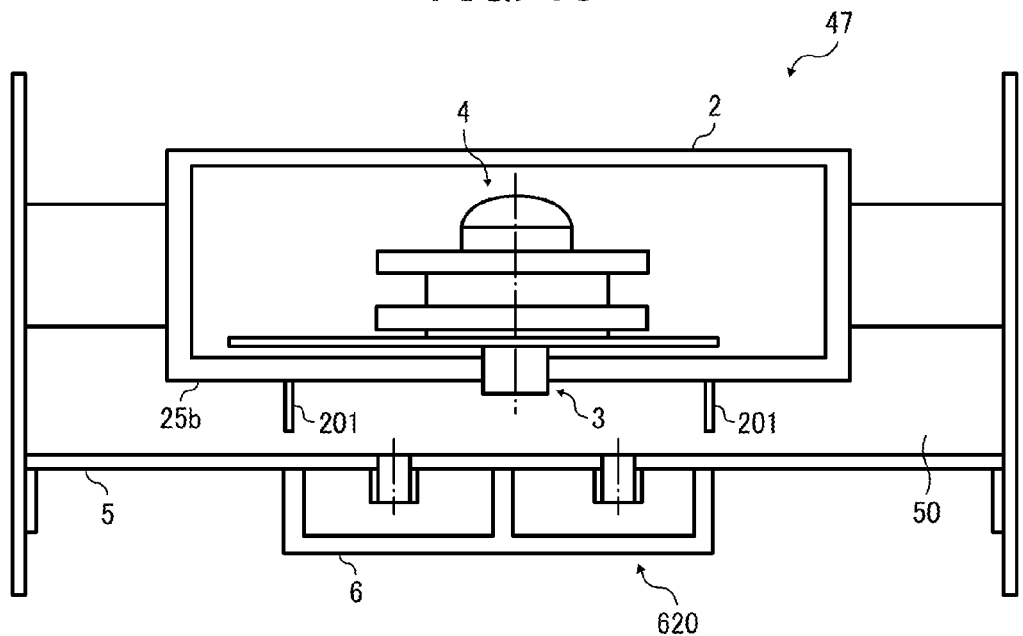
FIG. 10 is a schematic sectional view of the bottom sound-absorption device and the laser writing device in a configuration including a sound guide member.

FIG. 10 is a schematic sectional view of a sound guide member 201, serving as a wall-like projected unit, disposed on the bottom wall 25*b* of the casing 2 of the laser writing device 47. The sound guide member 201 surrounds the periphery of the bearing 3 such that sound generated in the bearing 3 is guided toward the bottom sound-absorption device 620 without leakage of the sound to the outside. The arrangement of the sound guide member 201 can suppress leakage of the sound from the air cooling space 50 near the bearing 3 to the outside while allowing air to flow to the air cooling space 50 near the bearing 3.

Figure 11:
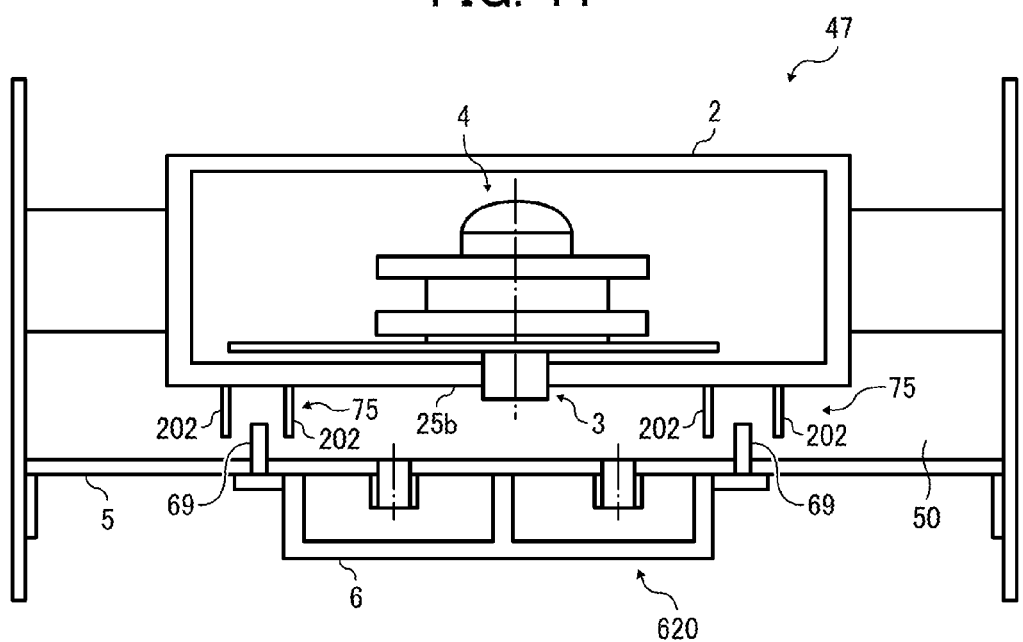
FIG. 11 is a schematic sectional view of the bottom sound-absorption device and the laser writing device in a configuration including a labyrinthine structure.

FIG. 11 is a schematic sectional view of a configuration with a labyrinthine structure 75 that is formed in the air cooling space 50 between the laser writing device 47 and the bottom sound-absorption device 620. The labyrinthine structure 75 is formed to surround the periphery of the bearing 3. In the configuration illustrated in FIG. 11, double upper walls 202 serving as wall-like projected units are arranged on the bottom wall 25*b* of the laser writing device 47 illustrated in FIG. 1 such that the double upper walls 202 surround the periphery of the bearing 3. Moreover, a lower wall 69 serving as a wall-like projected unit is disposed such that one portion of the sound absorption cover 6 projects not only between the double upper walls 202 but also upward from the bottom casing plate 5.

As illustrated in FIG. 11, the upper walls 202 and the lower wall 69 are offset to form the labyrinthine structure 75 with a certain clearance that allows air to move therethrough, thereby preventing heat from remaining trapped inside the air cooling space 50 near the bearing 3. Hence, a temperature rise can be suppressed. Moreover, since the labyrinth 75 structure has a complicated shape with a plurality of bent portions, a sound path is bent for a plurality of times for sound that is to be transmitted from the air cooling space 50 near the bearing 3 to the outside. When the sound is diffracted for a plurality of times, the sound becomes quieter. Accordingly, leakage of the sound from the clearance can be suppressed in spite of the presence of the clearance. The arrangement of the labyrinthine structure 75 enables the bottom sound-absorption device 620 to absorb the sound, and suppresses leakage of the sound from the air cooling space 50 near the bearing 3 to the outside while allowing air to flow to the air cooling space 50 near the bearing 3.

The copier 500 serving as one example of an image forming apparatus can provide effects described below.

[Aspect A]

An image forming apparatus such as the copier 500 includes an optical deflector such as the polygon scanner 4, an optical deflector casing such as the casing 2, a bearing such as the bearing 3, and a sound absorption unit such as the bottom sound-absorption device 620. The optical deflector allows a rotational reflection member such as the polygon mirror 48 to reflect and deflect an optical beam emitted from a light source to perform optical scanning. The optical deflector casing provides a sealed space, such as the polygon arrangement space 45, in which the optical deflector is disposed. The bearing rotatably supports a rotation shaft, such as the shaft 40, of the rotational reflection member with respect to the optical deflector casing. The sound absorption unit with a Helmholtz resonator absorbs sound generated by rotation of the rotational reflection member. At least one portion of the bearing is exposed to external space, such as the air cooling space 50, outside the sealed space from the optical deflector casing, and the sound absorption unit is arranged in a position opposite the exposed bearing with the external space therebetween. Accordingly, as described above in the exemplary embodiment, although heat is generated in the bearing by rotation of the rotational reflection member, such heat is cooled by gas of the external space. This can suppress a temperature rise near the optical deflector when the optical deflector is driven. Moreover, although sound is generated in the bearing by rotation of the rotational reflection member, such sound is absorbed by the sound absorption unit arranged in the position opposite the bearing with the external space therebetween. This can suppress generation of sound when the optical deflector is rotationally driven. According to the aspect A, therefore, when the optical deflector is rotationally driven, generation of sound can be suppressed. Meanwhile, a temperature rise near the optical deflector can be suppressed.

[Aspect B]

In the aspect A, a member, such as the bottom casing plate 5, that forms the sound absorption unit and the optical deflector casing such as the casing 2 are different members. Such a member and the optical deflector casing are connected via a fixation portion of at least one of other members such as the front casing plate 510 and the back casing plate 530. Therefore, as described above in the exemplary embodiment, the vibration transmitted from the optical deflector such as the polygon scanner 4 to the optical deflector casing is attenuated when the vibration is transmitted in a solid-borne manner to another member via the fixation portion. The vibration is further attenuated when being transmitted in the solid-borne manner from the other member to a member of the sound absorption unit via the fixation portion. This can suppress transmission of the vibration generated by rotation of the optical deflector to the member of the sound absorption unit, thereby suppressing generation of sound from the Helmholtz resonator of the sound absorption unit.

[Aspect C]

According to any of the aspects A and B, the member such as the bottom casing plate forming a wall arranged opposite the external space such as the air cooling space 50 with respect to the sound absorption unit such as the bottom sound-absorption device 620 is made of metal. Therefore, as described in the exemplary embodiment, the wall of the sound absorption unit is made of metal that has a higher density than resin and provides good sound insulation, so that transmission of sound can be suppressed.

[Aspect D]

According to any of the aspects A through C, a communication unit such as the communication portion 603 of the Helmholtz resonator in the sound absorption unit such as the bottom sound-absorption device 620 is formed by drawing such as burring process. Accordingly, as described above in the exemplary embodiment, a communication unit including an opening portion such as the opening 602 can be formed without arranging a new member to form the communication unit with respect to a member that forms one portion of a wall of a cavity such as the cavity portion 601, thereby reducing costs of the sound absorption unit such as the bottom sound-absorption device 620.

[Aspect E]

According to any of the aspects A through D, a short pipe forming the communication unit such as the communication portion 603 of the Helmholtz resonator in the sound absorption unit such as the bottom sound-absorption device 620 is entered into the cavity such as the cavity portion 601. Therefore, as described in the exemplary embodiment, an edge of the short pipe is hidden, and thus an operator is not disturbed when performing operation such as mounting operation and maintenance operation.

[Aspect F]

According to any of the aspects A through E, a member such as the sound absorption cover 6 forming the cavity such as the cavity portion 601 of the Helmholtz resonator in the sound absorption unit such as the bottom sound-absorption device 620 is made of a moldable material such as resin. Accordingly, as described in the exemplary embodiment, the member is made of a material that can be readily processed, and a volume of the cavity can be obtained with high accuracy while a sealed property remains. Thus, the volume of the cavity is obtained, so that sound of a low frequency can be absorbed. Moreover, the cavity is formed with high accuracy while a sealed property remains. This enhances a sound absorption effect.

[Aspect G]

According to any of the aspects A through F, there is a plurality of members, such as the bottom casing plate 5 and the sound absorption cover 6, that form the Helmholtz resonator of the sound absorption unit such as the bottom sound-absorption device 620. Accordingly, as described above in the exemplary embodiment, the cavity such as the cavity portion 601 with a predetermined volume can be readily formed compared to a case where the Helmholtz resonator of the sound absorption unit is formed by only one member.

[Aspect H]

According to the aspect G, the plurality of members such as the bottom casing plate 5 and the sound absorption cover 6 forming the Helmholtz resonator are fastened with screws such as the cover fixation screws 65. Therefore, as described in the exemplary embodiment, the plurality of members are firmly tightened to enhance the degree of sealing, and an sound absorption effect can be enhanced in the sound absorption unit such as the bottom sound-absorption device 620 as the Helmholtz resonator.

[Aspect I]

According to any of the aspects A through H, a wall-like projected unit, such as the sound guide member 201, that surrounds the periphery of the bearing such as the bearing 3 is arranged on a surface opposite the external space such as the air cooling space 50 with respect to the optical deflector such as the casing 2. Accordingly, as described above in the exemplary embodiment, leakage of sound from the external space near the bearing to the outside can be suppressed while air is flowing to the external space near the bearing.

[Aspect J]

According to any of the aspects A through I, wall-like projected units such as the lower wall 69 and the upper wall 202 surrounding the periphery of the bearing such as the bearing 3 are arranged on respective surfaces opposite the external space such as the air cooling space 50 with respect to the sound absorption unit such as the bottom sound-absorption device 620 and the optical deflector casing such as the casing 2. Moreover, a path extending from the inside of space surrounded by the projected units toward the outside via clearance formed by the projected units has a shape that includes a plurality of bent portions such as the labyrinthine structure 75. With such a configuration, as described above in the exemplary embodiment, leakage of sound from the external space near the bearing can be suppressed while air is flowing to the external space near the bearing, and the sound can be absorbed by the sound absorption unit.

The present invention has been described above with reference to specific exemplary embodiments. Note that the present invention is not limited to the details of the embodiments described above, and various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. An image forming apparatus comprising:
    a light source;
    an optical deflector having a rotational reflection member configured to reflect and deflect an optical beam emitted from the light source, the optical deflector configured to perform optical scanning;
    an optical deflector casing configured to seal a space in which the optical deflector is disposed;
    a bearing configured to rotatably support a rotation shaft of the rotational reflection member on the optical deflector casing; and
    at least one sound absorption unit having an opening and a cavity portion, the at least one sound absorption unit disposed opposite the bearing, with the opening located at a distance from an end of the bearing.

2. The image forming apparatus according to claim 1, wherein a diameter of the opening is smaller than a diameter of the bearing.

3. The image forming apparatus according to claim 1, wherein the at least one sound absorption unit and the optical deflector casing are connected via at least one fixation portion.

4. The image forming apparatus according to claim 1, wherein the at least one sound absorption unit includes:
    a metal portion configured to form the opening; and
    a resin portion configured to form the cavity portion.

5. The image forming apparatus according to claim 4, wherein the metal portion configured to form the opening is configured to be screwed to the resin portion to form the cavity portion.

6. The image forming apparatus according to claim 1, wherein the at least one sound absorption unit includes a short pipe configured to form the opening, and
    wherein the short pipe is configured to be inserted into the cavity portion.

7. The image forming apparatus according to claim 1, wherein the at least one sound absorption unit includes a plurality of sound absorption units.

* * * * *